(12) United States Patent
Xue et al.

(10) Patent No.: US 12,442,531 B2
(45) Date of Patent: Oct. 14, 2025

(54) COMBUSTION CHAMBER AND GAS APPARATUS

(71) Applicants: WUHU MIDEA KITCHEN AND BATH APPLIANCES MFG. CO., LTD., Wuhu (CN); MIDEA GROUP CO., LTD., Foshan (CN)

(72) Inventors: Chaoxiong Xue, Wuhu (CN); Jian Gou, Wuhu (CN); Guoping Xu, Wuhu (CN); Zhong Yin, Wuhu (CN); Guorong Liang, Wuhu (CN)

(73) Assignees: WUHU MIDEA KITCHEN AND BATH APPLIANCES MFG. CO., LTD., Wuhu (CN); MIDEA GROUP CO., LTD., Foshan (CN)

( * ) Notice: Subject to any disclaimer, the term of this patent is extended or adjusted under 35 U.S.C. 154(b) by 757 days.

(21) Appl. No.: 17/772,501

(22) PCT Filed: Oct. 23, 2020

(86) PCT No.: PCT/CN2020/123267
§ 371 (c)(1),
(2) Date: Apr. 27, 2022

(87) PCT Pub. No.: WO2021/083047
PCT Pub. Date: May 6, 2021

(65) Prior Publication Data
US 2022/0373178 A1    Nov. 24, 2022

(30) Foreign Application Priority Data

Oct. 31, 2019   (CN) .......................... 201911054566.1
Oct. 31, 2019   (CN) .......................... 201911056269.0

(Continued)

(51) Int. Cl.
*F23M 5/08*    (2006.01)
*F23D 14/66*   (2006.01)
(Continued)

(52) U.S. Cl.
CPC ............. *F23M 5/085* (2013.01); *F23D 14/66* (2013.01); *F23L 9/00* (2013.01); *F23L 9/02* (2013.01);
(Continued)

(58) Field of Classification Search
CPC ..................... F23M 5/085; F23M 9/02; F23M 2900/05003; F23D 14/66; F23L 9/00;
(Continued)

(56) References Cited

U.S. PATENT DOCUMENTS 2,110,841 A  *  3/1938  Maier ....................... F24H 9/02
                                                            220/684
2,299,154 A  *  10/1942 Lair ........................ F24H 9/1836
                                                            126/145
(Continued)

FOREIGN PATENT DOCUMENTS

CA      2638435 A1     1/2010
CN      1950648 A      4/2007
(Continued)

OTHER PUBLICATIONS

CN-110296536-A translation (Year: 2019).*
(Continued)

*Primary Examiner* — Steven S Anderson, II
*Assistant Examiner* — Kurt Wolford
(74) *Attorney, Agent, or Firm* — K&L Gates LLP

(57) ABSTRACT

The present disclosure discloses a combustion chamber and a combustion apparatus. The combustion chamber includes: a first surrounding plate located on an outer side and a second surrounding plate located on an inner side. A com- (Continued)

bustion cavity is defined by the second surrounding plate. The first surrounding plate and the second surrounding plate are spaced apart from each other to define at least one air duct in communication with the combustion cavity. Each of the at least one air duct has an air inlet hole formed in the first surrounding plate, and an air outlet hole formed in the second surrounding plate.

11 Claims, 13 Drawing Sheets

(30) Foreign Application Priority Data

| Oct. 31, 2019 | (CN) | ............... | 201911056280.7 |
| Oct. 31, 2019 | (CN) | ............... | 201921868350.4 |
| Oct. 31, 2019 | (CN) | ............... | 201921868386.2 |
| Oct. 31, 2019 | (CN) | ............... | 201921868387.7 |
| Oct. 31, 2019 | (CN) | ............... | 201921868388.1 |

(51) Int. Cl.

| *F23L 9/00* | (2006.01) |
| *F23L 9/02* | (2006.01) |
| *F23L 15/00* | (2006.01) |
| *F23M 9/02* | (2006.01) |
| *F24H 1/00* | (2022.01) |
| *F24H 1/12* | (2022.01) |
| *F24H 9/00* | (2022.01) |
| *F24H 9/14* | (2006.01) |

(52) U.S. Cl.
CPC ............... *F23L 15/00* (2013.01); *F23M 9/02* (2013.01); *F24H 1/0036* (2013.01); *F24H 1/124* (2013.01); *F24H 9/0089* (2013.01); *F24H 9/14* (2013.01); *F23M 2900/05003* (2013.01)

(58) Field of Classification Search
CPC ........... F23L 9/02; F23L 15/00; F24H 1/0036; F24H 1/124; F24H 9/0089; F24H 9/14
See application file for complete search history.

(56) References Cited

U.S. PATENT DOCUMENTS

| 4,004,056 A | 1/1977 | Carroll |
| 2005/0050896 A1 | 3/2005 | McMasters |
| 2015/0121857 A1* | 5/2015 | Tsumagari ............... F23D 11/44 60/303 |
| 2016/0025374 A1 | 1/2016 | Karkow et al. |
| 2019/0154300 A1 | 5/2019 | Kondo et al. |
| 2019/0186785 A1 | 6/2019 | Ono |

FOREIGN PATENT DOCUMENTS

| CN | 2926852 Y | | 7/2007 |
| CN | 203364399 U | | 12/2013 |
| CN | 204665366 U | * | 9/2015 |
| CN | 105627298 A | | 6/2016 |
| CN | 106765324 A | * | 5/2017 |
| CN | 107131497 A | | 9/2017 |
| CN | 108426244 A | | 8/2018 |
| CN | 110145860 A | | 8/2019 |
| CN | 110173897 A | | 8/2019 |
| CN | 110296536 A | * | 10/2019 |
| CN | 211084459 U | | 7/2020 |
| CN | 211601143 U | | 9/2020 |
| CN | 211695436 U | | 10/2020 |
| CN | 211823178 U | | 10/2020 |
| CN | 212511829 U | | 2/2021 |
| DE | 4208611 A1 | | 9/1993 |
| EP | 0859204 A2 | | 8/1998 |
| EP | 2618062 A2 | | 7/2013 |
| JP | S5238646 A | | 3/1977 |
| JP | S5942440 U | | 3/1984 |
| JP | S6060537 U | | 4/1985 |
| JP | H0166557 U | | 4/1989 |
| JP | H0658527 A | | 3/1994 |
| JP | H0659751 U | | 8/1994 |
| JP | 2015145774 A | | 8/2015 |
| JP | 2019095116 A | | 6/2019 |

OTHER PUBLICATIONS

CN-204665366-U translation (Year: 2015).*
OA1 for JP application 2022-525274 issued Jun. 20, 2023.
Extended European Search Report issued Nov. 11, 2022 regarding EP20880731.3.
1st OA & 1st Search issued Feb. 3, 2023 for CN Application No. 201911056269.0.
1st OA & 1st Search issued Feb. 3, 2023 for CN Application No. 201911056280.7.
Second OA received in CN Application No. 201911056269.0; mailed Oct. 29, 2023.
Rejection Decision received in CN Application No. 201911056280. 7; mailed Oct. 31, 2023.
Second OA received in JP Patent Application No. 2022-525274; mailed Dec. 19, 2023.
ISR of PCT No. PCT/CN2020/123267.
First OA received in CN Application No. 201911054566.1; mailed Apr. 9, 2024.
Rejection Decision received in CN Application No. 201911056269. 0; mailed Feb. 29, 2024.

* cited by examiner

COMBUSTION CHAMBER AND GAS APPARATUS

CROSS-REFERENCES TO RELATED APPLICATIONS

The present disclosure is a national phase application of International Application No. PCT/CN2020/123267, filed on Oct. 23, 2020, which claims priorities to Chinese Patent Applications No. 201921868388.1, No. 201911054566.1, No. 201911056269.0, No. 201921868350.4, No. 201921868386.2, No. 201921868387.7, and No. 201911056280.7, filed on Oct. 31, 2019, the entireties of which are herein incorporated by reference.

FIELD

The present disclosure relates to the field of water heaters, and more particularly, to a combustion chamber and a gas apparatus.

BACKGROUND

In order to prevent high-temperature heat energy from being transmitted outside a combustion chamber to adversely affect the life of other components in a gas apparatus, existing combustion chambers are usually fabricated in the following two types. One type uses oxygen-free copper to enclose a combustion chamber, and coils a water pipe on an outer wall of the oxygen-free copper to cool down the combustion chamber, thereby prolonging the service life of components. Disadvantages of this type of combustion chamber lie in high process requirements for welding the coiled pipe and thus high difficulty of fabricating the combustion chamber. In addition, the use of a large amount of oxygen-free copper material incurs high fabrication costs. Also, when the temperature is low in winter, condensed water is easily generated on a wall surface of the combustion chamber with the coiled pipe, thus affecting the life of a heat exchanger. The other type is to provide a heat insulation material on an inner wall of the combustion chamber. The heat insulation material is high in cost, and has a poor heat insulation effect when its thickness and sealing performance are inadequate.

On the above basis, it is necessary to optimize a structure of the combustion chamber and design a structure with low costs, simple processes, and a good heat insulation effect.

SUMMARY

The present disclosure aims to solve at least one of the above problems to some extent.

To this end, the present disclosure provides a combustion chamber featuring simple fabrication processes, low fabrication costs, and high heat efficiency.

The present disclosure further provides a gas apparatus featuring a simple structure, low fabrication costs, a long service life, and high heat efficiency.

A combustion chamber according to some embodiments in a first aspect of the present disclosure includes a first surrounding plate located on an outer side and a second surrounding plate located on an inner side. A combustion cavity is defined by the second surrounding plate. The first surrounding plate and the second surrounding plate are spaced apart from each other to define at least one air duct in communication with the combustion cavity. Each of the at least one air duct has an air inlet hole formed in the first surrounding plate, and an air outlet hole formed in the second surrounding plate.

Therefore, with the combustion chamber according to the above embodiments of the present disclosure, the at least one air duct in communication with the combustion cavity is defined by the first surrounding plate and the second surrounding plate. Air inside the at least one air duct is sprayed into the combustion cavity, thereby not only cooling the first surrounding plate and thus preventing heat from being transferred outside the chamber, but also supplies secondary air to a burner and thus improving heat efficiency.

In one embodiment, at least one of a bottom end and a top end of each of the at least one air duct is closed.

In one embodiment, the air inlet hole and the air outlet hole are staggered along a height direction.

Further, in one example, the air inlet hole is located above the air outlet hole along a height direction.

In one embodiment, the first surrounding plate and the second surrounding plate together define a pipe groove extending along a horizontal direction.

In one embodiment, the first surrounding plate includes a first rear plate, a first left plate connected to a left edge of the first rear plate, a first right plate connected to a right edge of the first rear plate, and a first front plate connected to a front edge of the first left plate and a front edge of the first right plate. The first rear plate, the first left plate, and the first right plate are integrally formed.

Further, in one example, the second surrounding plate includes a second rear plate, a second left plate connected to a left edge of the second rear plate, a second right plate connected to a right edge of the second rear plate, and a second front plate connected to a front edge of the second left plate and a front edge of the second right plate. The second rear plate, the second left plate, and the second right plate are integrally formed.

Further, in one example, an upper end of the second front plate is formed as a bent plate, and the bent plate is at least partially attached to an inner side wall of the first front plate to close an upper side of the at least one air duct.

Further, in one example, a heat-insulating air chamber is defined by an upper side of the bent plate and the first front plate and is in no communication with the combustion cavity.

Further, in one example, a part of the air inlet holes are adjacent to the bent plate.

In one embodiment, the air inlet hole is in an elongated shape.

In one embodiment, a hole wall of the air outlet hole of the second surrounding plate forms an air shielding plate extending towards an inner wall of the first surrounding plate.

In one embodiment, at least one of the first surrounding plate and the second surrounding plate is a steel plate.

In one embodiment, the combustion cavity is defined by the second surrounding plate, the first surrounding plate and the second surrounding plate are spaced apart from each other to define at least a first-layer air duct and a second-layer air duct that are in communication with the combustion cavity, each of the first-layer air duct and the second-layer air duct has an air inlet hole formed in the first surrounding plate, and an air outlet hole formed in the second surrounding plate, the air inlet hole of the first-layer air duct is located above the air outlet hole of the first-layer air duct along a height direction, and the air inlet hole of the second-layer air duct is located below the air outlet hole of the second-layer air duct along the height direction.

In one embodiment, the combustion cavity is defined by the second surrounding plate, the first surrounding plate and the second surrounding plate are spaced apart from each other to define the at least one air duct in communication with the combustion cavity, each of the at least one air duct has the air inlet hole formed in the first surrounding plate, and the air outlet hole formed in the second surrounding plate, and the air inlet hole is arranged above the air outlet hole along a height direction.

In one embodiment, the combustion cavity is defined by the second surrounding plate, the first surrounding plate and the second surrounding plate are spaced apart from each other to define the at least one air duct in communication with the combustion cavity, and the first surrounding plate and the second surrounding plate together define a pipe groove extending along a horizontal direction.

A combustion chamber according to other embodiments in the first aspect of the present disclosure includes a first surrounding plate located on an outer side and a second surrounding plate located on an inner side. A combustion cavity is defined by the second surrounding plate. The first surrounding plate and the second surrounding plate are spaced apart from each other to define an air duct in communication with the combustion cavity and surrounding the combustion cavity along a circumferential direction of the combustion cavity. The air duct is partitioned into independent air cavities along the circumferential direction. Each of the air cavities has an independent air inlet hole and an independent air outlet hole. When a negative pressure is formed in the combustion cavity, air in the air duct is delivered into the combustion cavity.

With the combustion chamber according to the above embodiments of the present disclosure, the air duct is partitioned into independent air cavities along the circumferential direction. The multi-cavity structure improves cold air distribution, enabling the entire first surrounding plate to be evenly cooled, thereby prolonging the service life of the components of the gas apparatus. In addition, the multi-cavity structure makes it possible to deliver air to the combustion cavity from different directions at the same time, thereby supplying enough secondary air and improving combustion efficiency.

In one embodiment, air cavities are uniformly distributed along the circumferential direction of the combustion cavity.

In one embodiment, the air inlet hole and the air outlet hole are staggered along a height direction.

Further, in one example, the air inlet hole is located above the air outlet hole along the height direction.

In one embodiment, each of the air cavities has an air inlet hole provided on each of an upper side and a lower side thereof, and the air outlet hole is located between the air inlet holes on the upper side and the lower side of the air cavity.

In one embodiment, for each of the air cavities, an air flow enters the air cavity from a middle of the air cavity and flows out from an upper side and a lower side of the air cavity.

In one embodiment, layers of the air duct are defined by the first surrounding plate and the second surrounding plate and distributed along a height direction.

Further, in one example, each of the layers of the air duct has a same height and a same air flow direction.

In one embodiment, at least one of the first surrounding plate and the second surrounding plate is a steel plate.

A combustion chamber according to yet other embodiments in the first aspect of the present disclosure includes a first surrounding plate located on an outer side and a second surrounding plate located on an inner side. A combustion cavity is defined by the second surrounding plate. The first surrounding plate and the second surrounding plate are spaced apart from each other to define a single-cavity air duct in communication with the combustion cavity and surrounding the combustion cavity along a circumferential direction of the combustion cavity. The single-cavity air duct has an air inlet hole and an air outlet hole. When a negative pressure is formed in the combustion cavity, air in the single-cavity air duct is delivered into the combustion cavity.

With the combustion chamber according to the above embodiments of the present disclosure, by providing the single-cavity air duct along the circumferential direction of the combustion cavity, the first surrounding plate can be cooled by air at substantially the same temperature along its circumferential direction, thereby prolonging the service life of the components of the gas apparatus. In addition, air can be delivered to the combustion cavity from the circumferential direction simultaneously, thereby supplying enough secondary air and improving the combustion efficiency.

In one embodiment, the air inlet hole and the air outlet hole are staggered along a height direction.

In one embodiment, an air flow in the single-cavity air duct flows from top to bottom.

In one embodiment, the single-cavity air duct has an air inlet hole provided on each of an upper side and a lower side thereof, and the air outlet hole is located between the air inlet holes on the upper side and the lower side of the single-cavity air duct.

In one embodiment, an air flow enters the single-cavity air duct from a middle of the single-cavity air duct and flows out from an upper side and a lower side of the single-cavity air duct.

In one embodiment, layers of the single-cavity air duct are defined by the first surrounding plate and the second surrounding plate and distributed along the height direction.

Further, in one example, each of the layers of the single-cavity air duct has a same height and a same air flow direction.

In one embodiment, the first surrounding plate is formed by enclosure of first plates, the second surrounding plate is formed by enclosure of second plates, each of the second plates includes sealing portions recessed from the inner side to the outer side, each of the sealing portions includes an upper wing plate, a lower wing plate, and a hook portion connecting the upper wing plate with the lower wing plate and abutting an outer wall of the first surrounding plate.

In a specific embodiment of the present disclosure, the air outlet hole is defined by the upper wing plate, and the lower wing plate is attached to an inner wall surface of the first surrounding plate.

In a specific embodiment of the present disclosure, the upper wing plate is further provided with an air shielding plate having one end connected to a hole wall of the air outlet hole and another end extending towards the first surrounding plate.

In one embodiment, reinforcing ribs recessed from the inner side to the outer side are formed on the second surrounding plate.

In one embodiment, each of the first surrounding plate and the second surrounding plate is a steel plate.

A gas apparatus according to embodiments in a second aspect of the present disclosure includes the combustion chamber according to any of the above embodiments. Since the combustion chamber according to any of the embodiments of the present disclosure has a simple structure, is easy to fabricate, prolongs the service life of the components by effectively preventing heat from being transferred to the outside, and improves the combustion efficiency, the gas apparatus according to the embodiments of the present disclosure features a simple structure, low fabrication costs, a long service life, and high heat efficiency.

Additional aspects and advantages of the present disclosure will be given at least in part in the following description, or become apparent at least in part from the following description, or can be learned from practicing of the present disclosure.

BRIEF DESCRIPTION OF THE DRAWINGS

The above and/or additional aspects and advantages of the present disclosure will become more apparent and more understandable from the following description of embodiments taken in conjunction with the accompanying drawings, in which.

Figure 1:
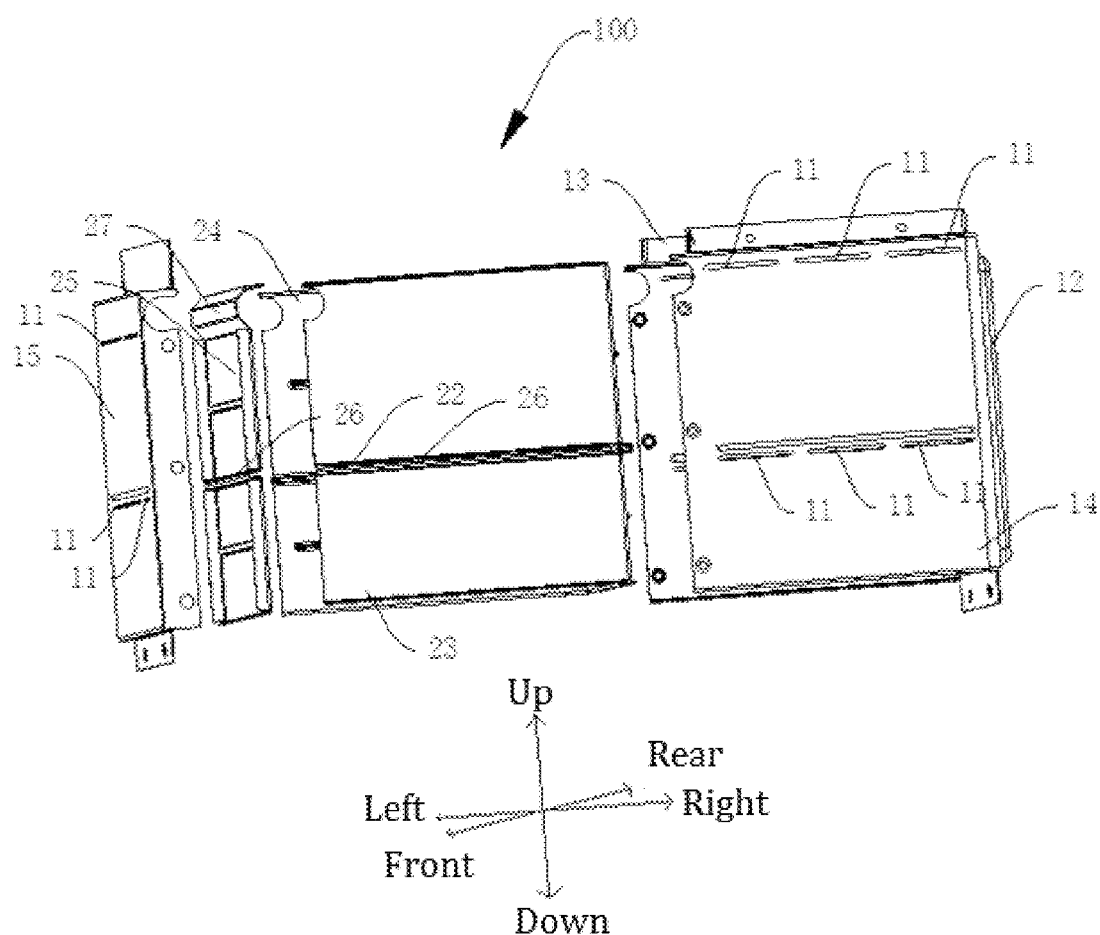
FIG. 1 is an exploded view of a combustion chamber according to some embodiments of the present disclosure.

REFERENCE NUMERALS gas apparatus 1000;
combustion chamber 100;
first surrounding plate 10; air inlet hole 11; first rear plate 12; first left plate 13; first right plate 14; first front plate 15; first plate 16;
second surrounding plate 20; combustion cavity 21; air outlet hole 22; second rear plate 23; second left plate 24; second front plate 25; air shielding plate 26; bent plate 27; reinforcing rib 28; second plate 29;
air duct 30; air cavity 31;
pipe groove 40;
heat-insulating air chamber 50;
sealing portion 60; upper wing plate 61; air shielding plate 611; lower wing plate 62; hook portion 63;
heat exchanger 200;
burner 300;
fan 400.

DETAILED DESCRIPTION OF THE DISCLOSURE

Embodiments of the present disclosure are described below in detail, examples of the embodiments are shown in accompanying drawings, and reference signs that are the same or similar throughout the drawings represent the same or similar components or components that have the same or similar functions. The embodiments described below with reference to the accompanying drawings are exemplary, are merely used to explain the present disclosure, and cannot be construed as a limit to the present disclosure.

The disclosure herein provides many different embodiments or examples for implementing different structures of the present disclosure. In order to simplify the disclosure of the present disclosure, components and arrangements of specific examples are described herein. Of course, the specific examples are exemplary only and are not intended to limit the present disclosure. Furthermore, reference numerals and/or reference letters may be repeated in different examples of the present disclosure for the purpose of simplicity and clarity, without indicating a relationship between different embodiments and/or arrangements under discussion. In addition, the present disclosure provides examples of various specific processes and materials, but applications of other processes and/or the use of other materials are conceivable.

Referring to FIG. 1 to FIG. 19, a combustion chamber 100 according to an embodiment of the present disclosure is described. The combustion chamber 100 is connected to a heat exchanger 200 and a burner 300. A part of each of the heat exchanger 200 and the burner 300 may be embedded in the combustion chamber 100, or both the heat exchanger 200 and the burner 300 are located outside the combustion chamber 100, or one of the heat exchanger 200 and the burner 300 is located in the combustion chamber 100 and the other of the heat exchanger 200 and the burner 300 is located outside the combustion chamber 100.

In one embodiment, the combustion chamber 100 includes a first surrounding plate 10 located on an outer side and a second surrounding plate 20 located on an inner side. Here, a combustion cavity 21 is defined by the second surrounding plate 20. That is, combustion flame of the burner 300 and high-temperature flue gas generated by the combustion flame are confined inside the combustion cavity 21.

The first surrounding plate 10 has the second surrounding plate 20 provided on an outer side thereof, and at least a part of the second surrounding plate 20 surrounds the outer side of the first surrounding plate 10. For example, the second surrounding plate 20 surrounds at least one of a left side, a right side, a front side, or a rear side of the first surrounding plate 10. In one embodiment, the second surrounding plate 20 surrounds the left and right sides of the first surrounding plate 10 and the front and rear sides of the first surrounding plate 10. In yet another embodiment, extension heights of the second surrounding plate 20 and the first surrounding plate 10 along a vertical direction (an up-down direction as illustrated in the figure) are substantially the same as each other, and the first surrounding plate 10 can be provided on all outer side of the second surrounding plate 20 to block heat transfer to the outside, thereby reducing heat outputted from the combustion chamber 100 to the outside, and avoiding damages to components of a gas apparatus 1000 due to a high temperature.

Figure 2:
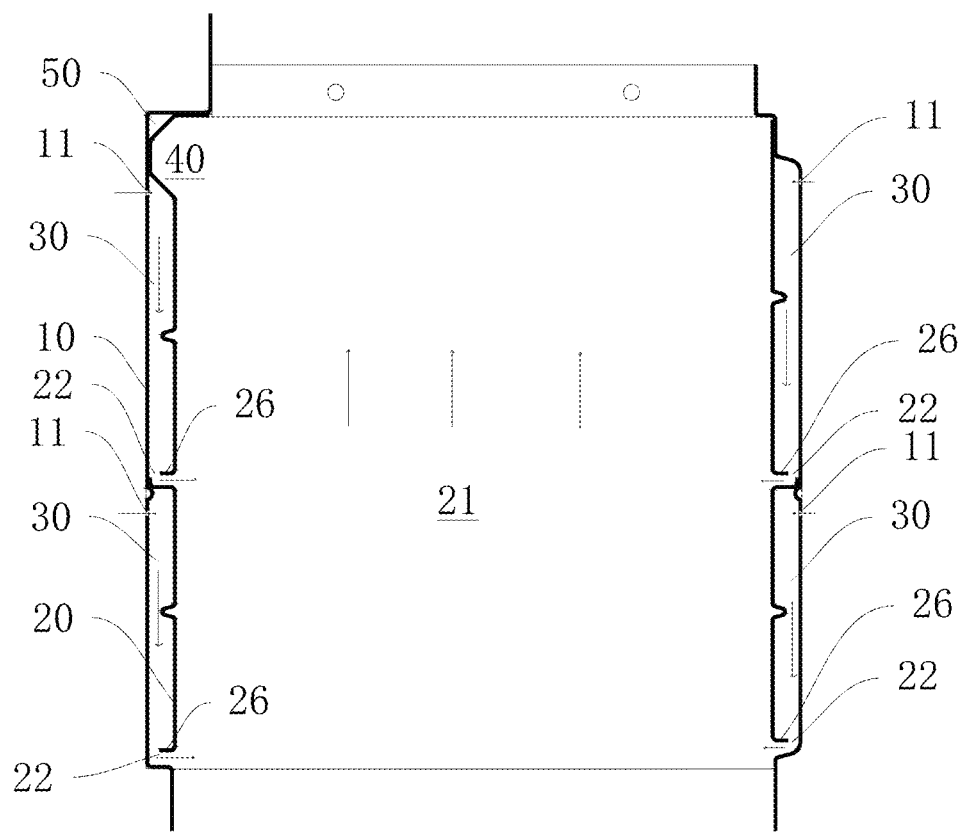
FIG. 2 is a cross-sectional view of a combustion chamber according to some embodiments of the present disclosure.

The combustion chamber 100 according to some embodiments in a first aspect of the present disclosure will be described below with reference to FIG. 1 to FIG. 6 and FIG. 11. As illustrated in FIG. 1 and FIG. 2, the first surrounding plate 10 and the second surrounding plate 20 are spaced apart from each other to define an air duct 30 in communication with the combustion cavity 21. Cool air in the air duct 30 takes away at least a part of heat of the first surrounding plate 10. That is, air in the air duct 30 is in a flowing state. Cold air from the outside can continuously enter the air duct 30 to keep taking away the heat of the first surrounding plate 10, and flow into the combustion cavity 21 to achieve secondary air supply to the burner 300. With the combustion chamber 100 according to the embodiments of the present disclosure, flowing air can be delivered to the air duct 30, which on the one hand cools the first surrounding plate 10, reduces heat diffused to the outside, and avoids damages to the components of the gas apparatus 1000, and on the other hand improves heat efficiency.

To raise a mixing ratio of the air in the air duct 30 and high-temperature gas in the combustion cavity 21 for a more complete combustion reaction and a more uniform temperature of flue gas flowing to the heat exchanger 200, an air flow in the air duct 30 of the combustion chamber 100 according to the embodiments of the present disclosure enters the combustion cavity 21 in a spraying manner. In one embodiment, the air duct 30 has an air inlet hole 11 formed in the first surrounding plate 10 and an air outlet hole 22 formed in the second surrounding plate 20. In this way, the cold air enters the air duct 30 through the first surrounding plate 10, is sprayed out from the air outlet hole 22 after passing through the air duct 30, and enters the combustion cavity 21.

Figure 6:
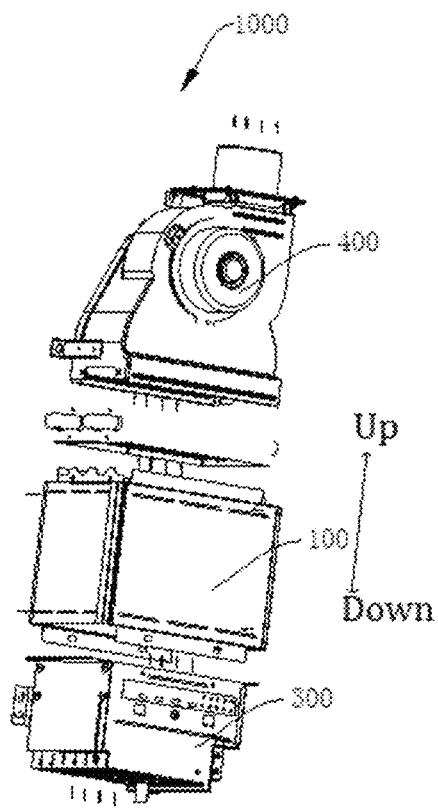
FIG. 6 is a schematic diagram showing a structure of a gas apparatus according to some embodiments of the present disclosure.

The combustion chamber 100 in the present disclosure can be applied to a forced-suction gas apparatus. As illustrated in FIG. 6, the forced-suction gas apparatus is provided with the burner 300, the combustion chamber 100, the heat exchanger 200, and a fan 400 in sequence from bottom to top. Under suction of the fan 400, a negative pressure is formed in the combustion cavity 21, and air from the outside can be sucked into the air duct 30 to cool the first surrounding plate 10.

It should be noted that, the air duct 30 defined by the first surrounding plate 10 and the second surrounding plate 20 can be one or more air ducts 30 distributed along a circumferential direction, and/or one or more air ducts 30 distributed along a height direction of the combustion chamber. Each of the one or more air ducts 30 may have an independent air inlet hole 11 and an independent air outlet hole 22, or air ducts 30 may share one air inlet hole 11 but have respective air outlet holes 22 from which air flows out of air ducts 30. Air ducts 30 may be in communication or in no communication with each other.

In short, with the combustion chamber 100 according to the embodiments of the present disclosure, at least one air duct 30 in communication with the combustion cavity 21 is defined by the first surrounding plate 10 and the second surrounding plate 20. Air inside the at least one air duct 30 is sprayed into the combustion cavity 21, thereby not only cooling the first surrounding plate 10 and thus preventing heat from being transferred to the outside, but also supplying secondary air to the burner 300 and thus improving heat efficiency.

In one embodiment, as illustrated in FIG. 2, at least one of a bottom end and a top end of the air duct 30 is closed. Namely, one of the bottom end and the top end of the air duct is closed, or both the bottom end and the top end of the air duct are closed. That is, after an air flow enters the air duct 30, an air path leading to the top end or the bottom end of the air duct 30 is closed, and the air flow can be forced to spray out through the air outlet hole 22 in the second surrounding plate 20.

In one embodiment, at least one of the first surrounding plate 10 and the second surrounding plate 20 of the combustion chamber 100 in the present disclosure is a steel plate. Compared with oxygen-free copper or a heat insulation material used in an existing combustion chamber, the steel plate has higher plasticity. Hence, a connection process between the first surrounding plate 10 and the second surrounding plate 20 is relatively simple. For example, when the first surrounding plate 10 and the second surrounding plate 20 are both steel plates, the first surrounding plate 10 and the second surrounding plate 20 are integrally formed by partial welding, and a structure of the air duct 30 can be formed by bending the first surrounding plate 10 or the second surrounding plate 20, thereby simplifying structuring and shaping.

Figure 5:
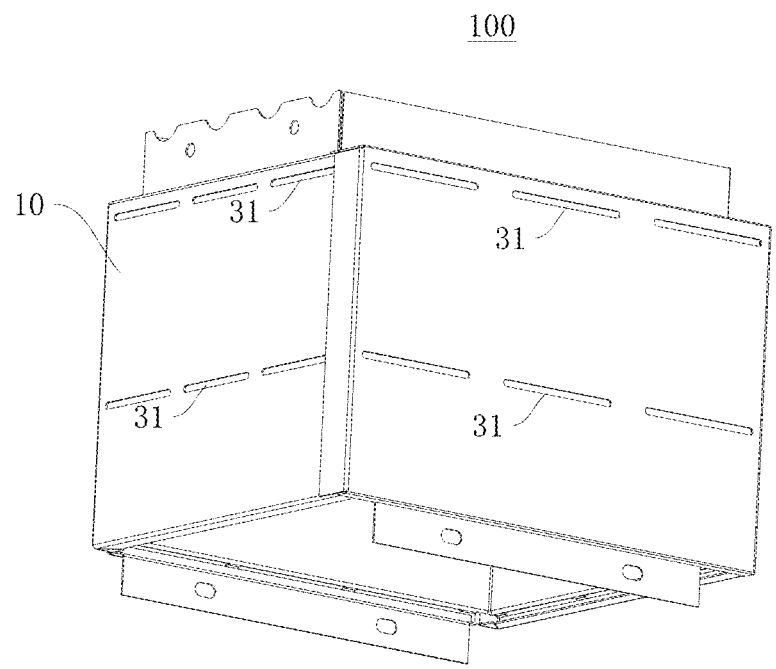
FIG. 5 is a perspective view of a combustion chamber according to some embodiments of the present disclosure.

In one embodiment, as illustrated in FIG. 1 and FIG. 5, the air duct 30 has the air inlet hole 11 and the air outlet hole 22 that extend along a horizontal direction and are staggered along a height direction. That is, air enters the air duct 30 from a horizontal direction of the first surrounding plate 10 and flows out of the air duct 30 from another horizontal direction of the second surrounding plate 20. In this manner, the air does not directly pass through the air duct 30 from a same horizontal direction, but can flow along the height direction to realize cooling of regions of the first surrounding plate 10 at different heights. Each air inlet duct 30 may have one or more air inlet holes 11. In one embodiment, along horizontal directions, the air inlet holes 11 are distributed across the circumference of the first surrounding plate 10, and an air inlet surface of the first surrounding plate 10 along the circumferential direction can be enlarged to ensure the first surrounding plate 10 to be sufficiently cooled.

In one embodiment, as illustrated in FIG. 1 and FIG. 5, the air inlet hole 11 is in an elongated shape. As such, a distribution length of the air inlet hole 11 can be extended as long as possible, thereby further enlarging the air inlet surface of the first surrounding plate 10 along the circumferential direction, and ensuring the first surrounding plate 10 to be fully cooled.

In one implementation, as illustrated in FIG. 2, the air inlet hole is located above the air outlet hole along the height direction to enable the air flow in the air duct 30 to flow from top to bottom. In this way, the air flow in the air duct 30 is delivered to a lower side of the combustion cavity 21, thereby supplying sufficient secondary air to the burner 300 of the gas apparatus 1000, and improving the combustion efficiency.

In one implementation, as illustrated in FIG. 2, the first surrounding plate 10 and the second surrounding plate 20 together define a pipe groove 40 extending along a left-right direction. A part of a water pipe of the heat exchanger 200 can pass through the pipe groove 40. That is, a part of the water pipe is arranged in and directly heated in the combustion cavity 21, thereby improving heat exchange efficiency between the flue gas and the water pipe.

In one embodiment, as illustrated in FIG. 1 and FIG. 5, the first surrounding plate 10 includes a first rear plate 12, a first left plate 13 connected to a left edge of the first rear plate 12, a first right plate 14 connected to a right edge of the first rear plate 12, and a first front plate 15 connected to a front edge of the first left plate 13 and a front edge of the first right plate 14, and the first rear plate 12, the first left plate 13, and the first right plate 14 are integrally formed. Correspondingly, the second surrounding plate 20 includes a second rear plate 23, a second left plate 24 connected to a left edge of the second rear plate 23, a second right plate connected to a right edge of the second rear plate 23, and a second front plate 25 connected to a front edge of the second left plate 24 and a front edge of the second right plate, and the second rear plate 23, the second left plate 24, and the second right plate are integrally formed.

In one embodiment, the first left plate 13 is connected to the left edge of the first rear plate 12, the first right plate 14 is connected to the right edge of the first rear plate 12, and the first front plate 15 is connected to the front edge of the first left plate 13 and the front edge of the first right plate 14. Correspondingly, the second left plate 24 is connected to the left edge of the second rear plate 23, the second right plate is connected to the right edge of the second rear plate 23, and the second front plate 25 is connected to the front edge of the second left plate 24 and the front edge of the second right plate.

That is, the first rear plate 12, the first left plate 13, and the first right plate 14 are integrally formed as a U-shaped structure, the first front plate 15 is configured to close an opening of the U-shaped structure, the second rear plate 23, the second left plate 24, and the second right plate are integrally formed as a U-shaped structure, and the second front plate 25 is configured to close an opening of the U-shaped structure. The combustion chamber is simple in its overall structure and shape and is easy to fabricate.

Further, in one example, as illustrated in FIG. 1 and with reference to FIG. 2, an upper end of the second front plate 25 is formed as a bent plate 27, and the bent plate 27 is at least partially attached to an inner side wall of the first front plate 15 to close an upper side of the at least one air duct 30. That is, an upward movement of the air flow is restricted by the bent plate 27, and thus the air can be reflected to flow downwardly into the combustion cavity 21 to supply secondary air to the burner 300.

Further, in one example, as illustrated in FIG. 5, a heat-insulating air chamber 50 is defined by an upper side of the bent plate 27 and the first front plate 15 and is in no communication with the combustion cavity 21. It can be understood that since the bent plate 27 is partially attached to the inner wall of the first front plate 15, the first front plate 15 has a high temperature at an attachment location where the bent plate 27 is attached to the first front plate 15. The heat-insulating air chamber 50 can block heat from being transferred to the first front plate 15, and lower the temperature at the attachment location to a certain extent.

Further, in one example, a part of the air inlet holes 11 are adjacent to the bent plate 27. That is, the cold air enters the air duct 30 from a side close to the bent plate 27, which facilitates the cold air continuously taking away heat at the attachment location where the bent plate 27 is attached to the first front plate 15, and prevents the temperature at the attachment location from being too high.

In one embodiment, a hole wall of the air outlet hole 22 of the second surrounding plate 20 forms an air shielding plate 26 extending towards an inner wall of the first surrounding plate 10. The air shielding plate 26 can guide the air flow towards the inner wall of the first surrounding plate 10 as much as possible, and the air flow can flow closely along the inner wall of the first surrounding plate 10. Therefore, the air can fully absorb heat of the first surrounding plate 10.

Figure 11:
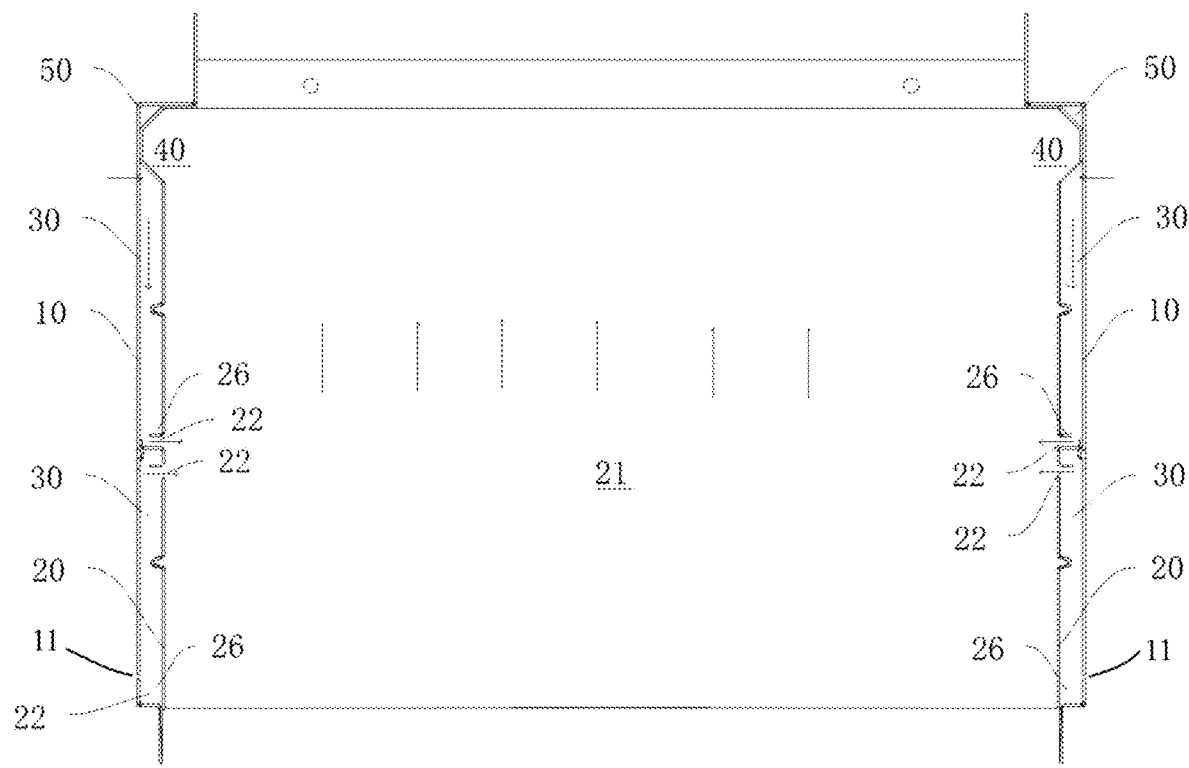
FIG. 11 is a cross-sectional view of a combustion chamber according to other embodiments of the present disclosure.

In one embodiment, as illustrated in FIG. 1 to FIG. 6 and with reference to FIG. 11, the first surrounding plate 10 and the second surrounding plate 20 are spaced apart from each other to define at least a first-layer air duct 30 and a second-layer air duct 30 that are in communication with the combustion cavity 21, each of the first-layer air duct 30 and the second-layer air duct 30 has an air inlet hole 11 formed in the first surrounding plate 10, and an air outlet hole 22 formed in the second surrounding plate 20. That is, driven by an air pressure, the air flow is sucked in from the outer side to the inner side, thereby on the one hand preventing the heat in the combustion cavity 21 from diffusing to the outside, and on the other hand taking away the heat of the first surrounding plate 10 to prevent the temperature of the first surrounding plate 10 from rising too high.

In other words, the air in the air duct 30 is in a flowing state. The cold air from the outside can continuously enter the first-layer air duct 30 and the second-layer air duct 30 to keep taking away the heat of the first surrounding plate 10, and flow into the combustion cavity 21 to achieve secondary air supply to the burner 300. With the combustion chamber 100 according to the embodiments of the present disclosure, flowing air can be delivered to the air duct 30, which on the one hand cools the first surrounding plate 10, reduces heat diffused to the outside, and avoids damages to the components of the gas apparatus 1000, and on the other hand improves the heat efficiency.

It should be noted that "first-layer" and "second-layer" are named in terms of the height direction of the combustion chamber 100. That is, at least two layers of the air duct 30 are distributed along the height direction of the combustion chamber 100. Each layer of the air duct 30 may be an independent cavity distributed along the circumferential direction or independent cavities distributed along the circumferential direction. Adjacent cavities may be in communication or in no communication with each other. Adjacent layers of the air duct 20 may be the same or different in terms of the structure and the number of cavities.

Figure 12:
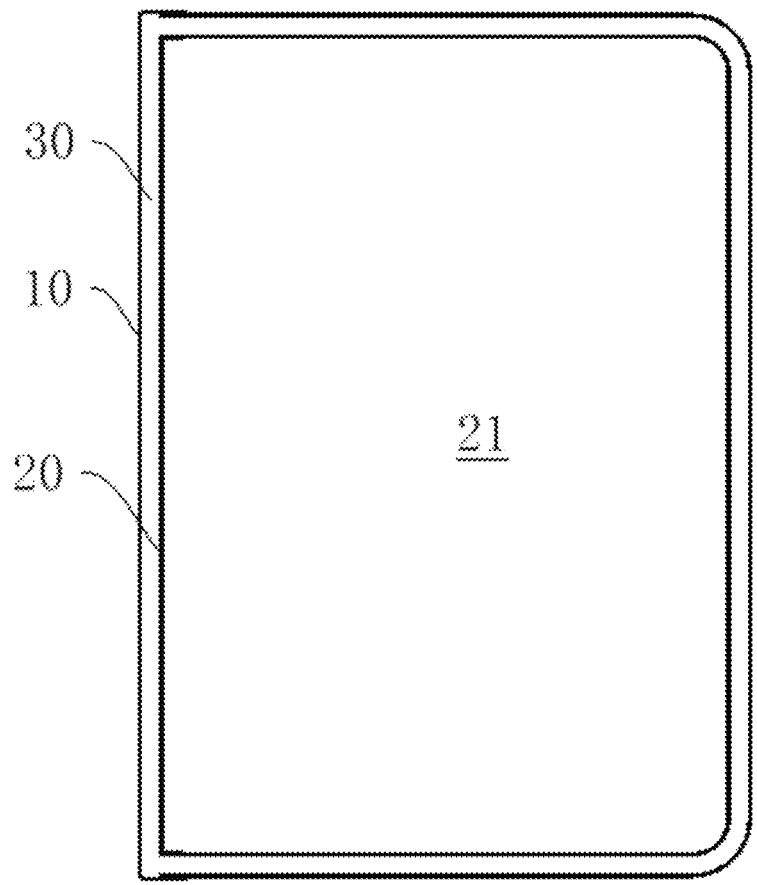
FIG. 12 is a schematic diagram showing a lateral structure of a combustion chamber according to yet other embodiments of the present disclosure.

In order to achieve a satisfying cooling effect, enough secondary air can be supplied to the combustion cavity 21. As illustrated in FIG. 12, an air flow direction in the first-layer air duct 30 and an air flow direction in the second-layer air duct may be towards each other according to this embodiment of the present disclosure. In one embodiment, the air inlet hole 11 of the first-layer air duct 30 is located above the air outlet hole 22 of the first-layer air duct 30 along the height direction, and the air inlet hole 11 of the second-layer air duct 30 is located below the air outlet hole 22 of the second-layer air duct 30 along the height direction.

In short, with the combustion chamber 100 according to the embodiments of the present disclosure, at least two layers of the air duct 30 that are in communication with the combustion cavity 21 are defined by the first surrounding plate 10 and the second surrounding plate 20, thereby not only cooling the first surrounding plate 10 and thus preventing heat from being transferred to the outside, but also supplying secondary air to the burner 300 and thus improving the heat efficiency.

Figure 3:
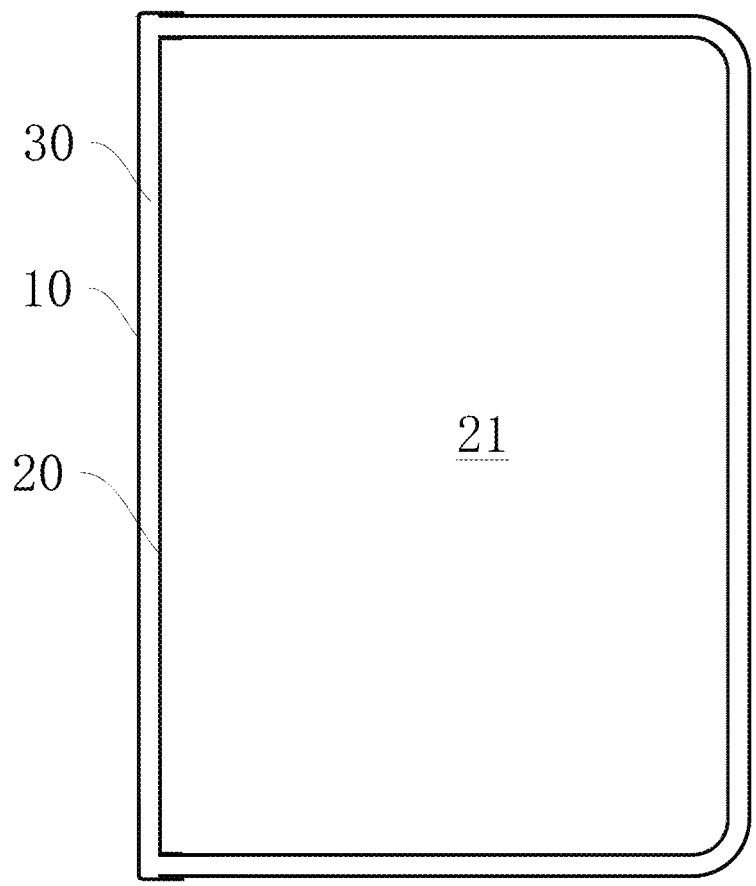
FIG. 3 is a cross-sectional view of a combustion chamber according to some embodiments of the present disclosure.
Figure 4:
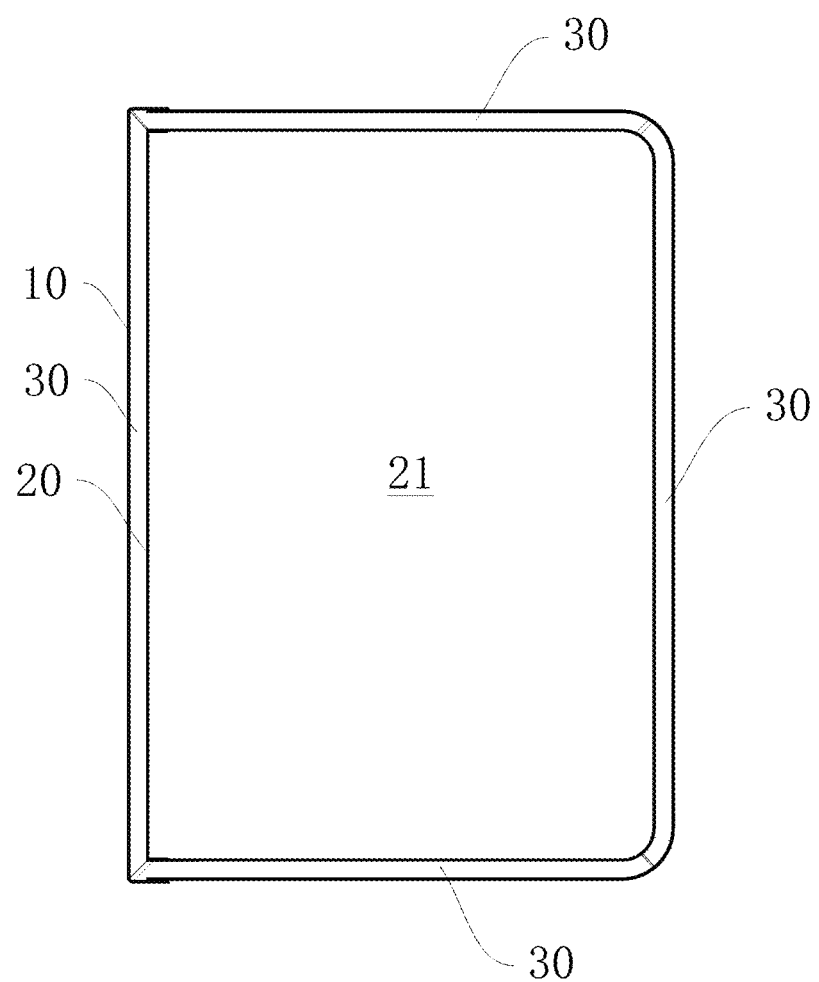
FIG. 4 is a cross-sectional view of a combustion chamber according to some embodiments of the present disclosure.

In one embodiment, as illustrated in FIG. 2 to FIG. 4, the air inlet hole 11 of the air duct 30 is formed in the first surrounding plate 10, and the air outlet hole 22 of the air duct 30 is formed in the second surrounding plate 20. That is, the cold air enters the air duct 30 through the first surrounding plate 10, flows out from the air outlet hole 22 after passing through the air duct 30, and enters the combustion cavity 21. In this case, the combustion chamber 100 of the present disclosure is applied to the forced-suction gas apparatus that is provided with the burner 300, the combustion chamber 100, the heat exchanger 200, and the fan 400 in sequence from bottom to top. Under the suction of the fan 400, the negative pressure is formed in the combustion cavity 21. The negative pressure enables air from the outside to be sucked into the air duct 30, thereby cooling the first surrounding plate 10.

In order to ensure that enough secondary air can be supplied during combustion of a mixture of air and gas, the air inlet hole 11 is arranged above the air outlet hole 22 along the height direction to promote the cool air in the air duct 30 to flow towards the burner 300, thereby providing sufficient secondary air for the combustion of the gas in the burner 300 and improving the combustion efficiency.

It should be noted that, the air duct 30 defined by the first surrounding plate 10 and the second surrounding plate 20 can be one or more air ducts 30 distributed along the circumferential direction, and/or one or more air ducts 30 distributed along the height direction of the combustion chamber 100. Each of the one or more air ducts 30 may have the independent air inlet hole 11 and the independent air outlet hole 22, or air ducts 30 may share one air inlet hole 11 but have respective air outlet holes 22 from which air flows out of air ducts 30. Air ducts 30 may be in communication or in no communication with each other.

In short, with the combustion chamber 100 according to the embodiments of the present disclosure, at least one air duct 30 in communication with the combustion cavity 21 is defined by the first surrounding plate 10 and the second surrounding plate 20, thereby not only cooling the first surrounding plate 10 and thus preventing heat from being transferred to the outside, but also supplying secondary air to the burner 300 and thus improving the heat efficiency.

In one embodiment, the first surrounding plate 10 and the second surrounding plate 20 together define the pipe groove 40 extending along a horizontal direction (a left-right direction in FIG. 1). A part of a water pipe of the heat exchanger 200 can pass through the pipe groove 40. That is, a part of the water pipe is arranged in and directly heated in the combustion cavity 21, thereby improving the heat exchange efficiency between the flue gas and the water pipe. With the pipe groove 40 extending along the horizontal direction, the heat exchange efficiency between the flue gas and the water pipe of the heat exchanger 200 is improved, the temperature of the first surrounding plate 10 is lowered by the air duct 30 to prevent the heat from being transferred to the outside, and the secondary air can be supplied to the burner 300 to improve the heat efficiency.

In one embodiment, as illustrated in FIG. 1 and FIG. 5, the air inlet hole 11 and the air outlet hole 22 are staggered along the height direction. For example, air enters the air duct 30 from a direction of the first surrounding plate 10 and flows out of the air duct 30 from another direction of the second surrounding plate 20. In this manner, the air does not directly pass through the air duct 30 from a same direction, but can flow along the height direction to realize cooling of regions of the first surrounding plate 10 at different heights. Each air inlet duct 30 may have one or more air inlet holes 11. In one embodiment, along horizontal directions, the air inlet holes 11 are distributed across the circumference of the first surrounding plate 10, and an air inlet surface of the first surrounding plate 10 along the circumferential direction can be enlarged to ensure the first surrounding plate 10 to be sufficiently cooled.

Optionally, the air duct 30 has the air inlet hole 11 formed in the first surrounding plate 10 and the air outlet hole 22 formed in the second surrounding plate 20, and the air inlet hole 11 is arranged above the air outlet hole 22 along the height direction. As a result, the air flow in the air duct 30 can be delivered into the combustion cavity 21 from top to bottom to supplement the secondary air towards the burner 200, thereby ensuring sufficient combustion.

In some embodiments of the present disclosure, the air duct 30 includes at least the first-layer air duct 30 and the second-layer air duct 30. That is, the combustion chamber 100 includes more than two layers of the air duct 30 along the height direction. By providing layers of the air duct 30, the first surrounding plate 10 can be cooled section-wise to improve the cooling effect.

Optionally, for both the first-layer air duct 30 and the second-layer air duct 30, the air inlet hole 11 is located above the air outlet hole 22. That is, air flows in the two layers of the air duct 30 flow along the same direction, and the air flows can quickly flow towards the burner 200 to ensure sufficient air supply for combustion reaction.

In order to achieve a satisfying cooling effect while supplying sufficient secondary air to the combustion cavity 21, as illustrated in FIG. 2, the air flow direction in the first-layer air duct 30 and the air flow direction in the second-layer air duct may be towards each other according to this embodiment of the present disclosure. In one embodiment, the air inlet hole 11 of the first-layer air duct 30 is located above the air outlet hole 22 of the first-layer air duct 30 along the height direction, and the air inlet hole 11 of the second-layer air duct 30 is located below the air outlet hole 22 of the second-layer air duct 30 along the height direction.

Figure 7:
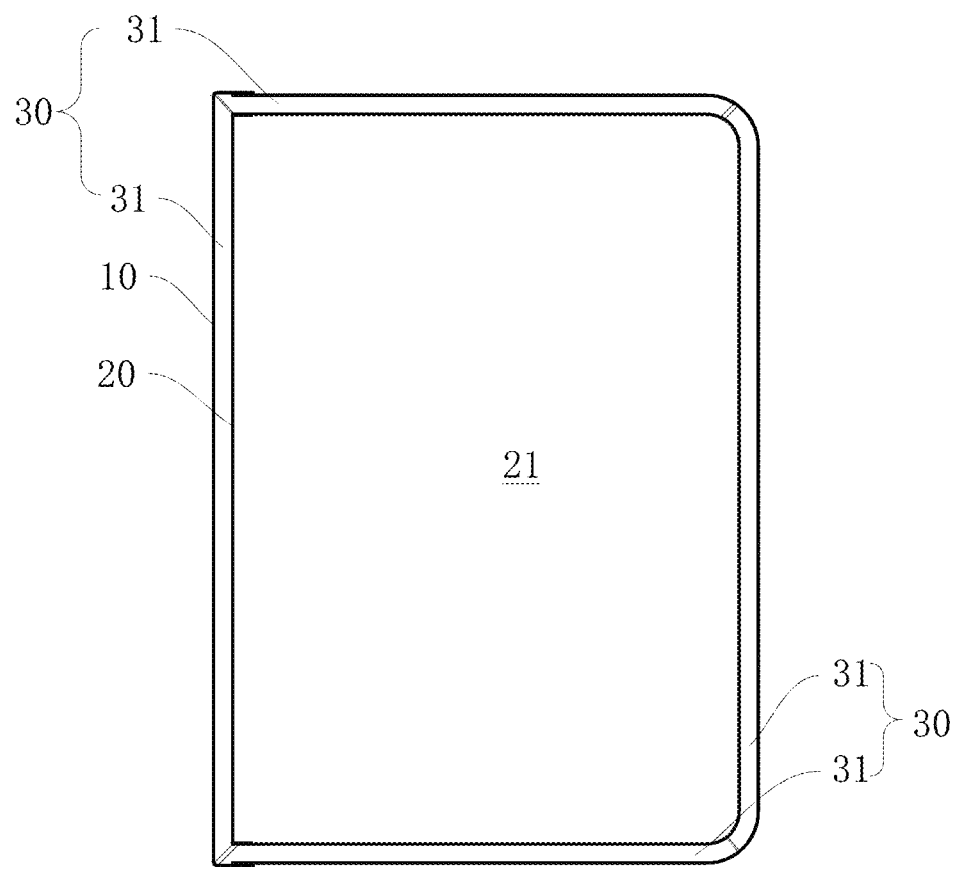
FIG. 7 is a cross-sectional view of a combustion chamber from an angle according to other embodiments of the present disclosure.

The combustion chamber 100 according to other embodiments in the first aspect of the present disclosure will be described with reference to FIG. 7 to FIG. 11. As illustrated in FIG. 7, the first surrounding plate 10 and the second surrounding plate 20 are spaced apart from each other to define an air duct 30 in communication with the combustion cavity 21 and surrounding the combustion cavity along a circumferential direction of the combustion cavity, the air duct 30 is partitioned into independent air cavities 31 along the circumferential direction, and each of the air cavities 31 has an independent air inlet hole 11 and an independent air outlet hole 22. When a negative pressure is formed in the combustion cavity 21, air in the air duct 30 is delivered into the combustion cavity 21.

In other words, an independent air flow can be formed in each air cavity 31. By arranging air cavities 31 along the circumferential direction of the combustion cavity 21, it is possible to cool the first surrounding plate 10 from the front side, the rear side, the left side, and the right side simultaneously and deliver air flows to the combustion cavity 21. Here, the orientation or position relationship indicated by the terms "front", "rear", "left", "right", etc., is based on the orientation or position relationship shown in the drawings, and is only for the convenience of describing the present disclosure and simplifying the description, rather than indicating or implying that the apparatus or element in question must have a specific orientation, or be constructed and operated in a specific orientation, and therefore cannot be understood as a limitation of the present disclosure.

Since air cavities 31 are independent of each other, fluxes of air flows in air cavities 31 may be the same as or different from each other. It can be understood that since an air cavity 31 adjacent to an air inlet side of the fan 400 has a high air flow velocity, the air inlet hole 11 of the air cavity 31 can be designed into a small size, and the flux of the air flow in the air cavity 31 can also be appropriately reduced.

In addition, the number of air cavities 31 set along each direction can be determined based on an air flow field. The air flow field is mainly related to air flow velocity, flow duct width, and presence/absence of interference object during traveling of air flow. For example, when the flow field is unobstructed, only one air cavity 31 may be provided; and when the flow field is obstructed, air cavities 31 may be provided to avoid a possible influence brought by an obstacle.

In short, with the combustion chamber 100 according to the embodiments of the present disclosure, the air duct 30 is partitioned into independent air cavities 31 along the circumferential direction. The multi-cavity structure 31 improves cold air distribution, enabling the entire first surrounding plate 10 to be evenly cooled, thereby prolonging the service life of the components of the gas apparatus 1000. In addition, the multi-cavity structure 31 makes it possible to deliver air to the combustion cavity 21 from different directions at the same time, thereby supplying enough secondary air and improving the combustion efficiency.

In one embodiment, as illustrated in FIG. 7, air cavities 31 are uniformly distributed along the circumferential direction of the combustion cavity 21. For example, the combustion cavity 21 has an air cavity 31 defined in each side thereof. Thus, a front air cavity 31 is formed on a front side of the combustion cavity 21, a rear air cavity 31 is formed on a rear side of the combustion cavity 21, a left air cavity 31 is formed on a left side of the combustion cavity 21, and a right air cavity 31 is formed on a right side of the combustion cavity 21. When a negative pressure is formed in the combustion cavity 21, the air from the outside can flow into the air cavity 31 from the air inlet hole 11, and then flow into the combustion cavity 21 from the air outlet hole 22, thereby taking away the heat of the first surrounding plate 10 and preventing the heat from diffusing to the outside.

Figure 8:
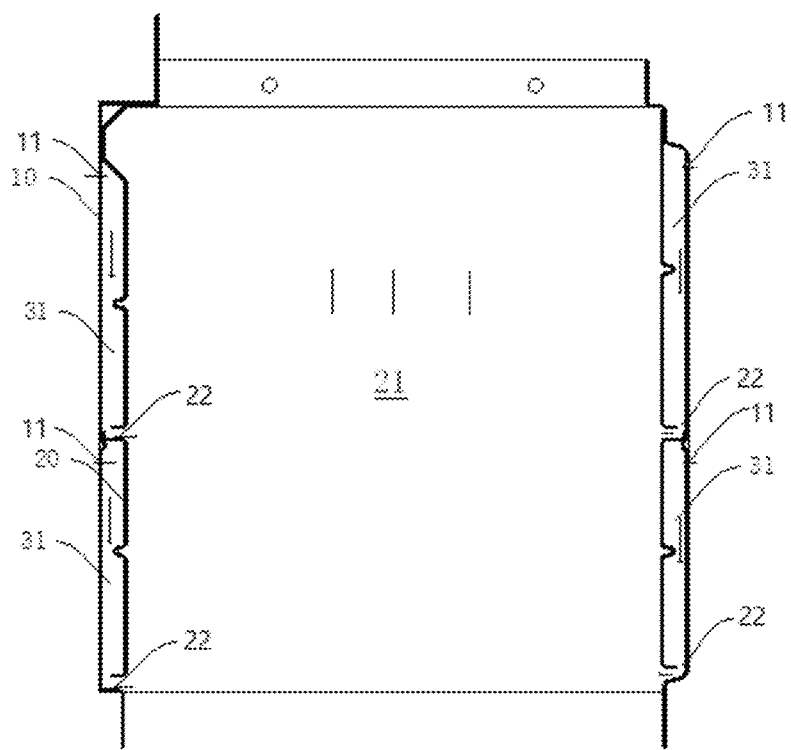
FIG. 8 is a cross-sectional view of a combustion chamber from another angle according to other embodiments of the present disclosure.

In one embodiment, as illustrated in FIG. 8 and with reference to FIG. 7, the air inlet hole 11 is formed in the first surrounding plate 10, and the air outlet hole 22 is formed in the second surrounding plate 20. In this way, the cold air can flow from the outer side to the inner side, and multiple cold air flows from the circumferential direction can block and blow away a hot air flow which thus cannot diffuse to the outside, thereby being more conducive to lowering the temperature of the first surrounding plate 10.

In one embodiment, as illustrated in FIG. 8, the air inlet hole 11 and the air outlet hole 22 are staggered along the height direction. For example, air enters each of the air cavities 31 from a direction of the first surrounding plate 10 and flows out of the air cavity 31 from another direction of the second surrounding plate 20. In this manner, the air does not directly pass through the air cavity 31 from a same height direction, and an air flow can flow along the height direction to realize cooling of regions of the first surrounding plate 10 at different heights. Each air cavity 31 may have one or more air inlet holes 11. In one embodiment, along horizontal directions, the air inlet holes 11 are distributed across the circumference of the first surrounding plate 10 as much as possible, and an air inlet surface of the first surrounding plate 10 along the circumferential direction can be enlarged to ensure the first surrounding plate 10 to be sufficiently cooled.

Figure 10:
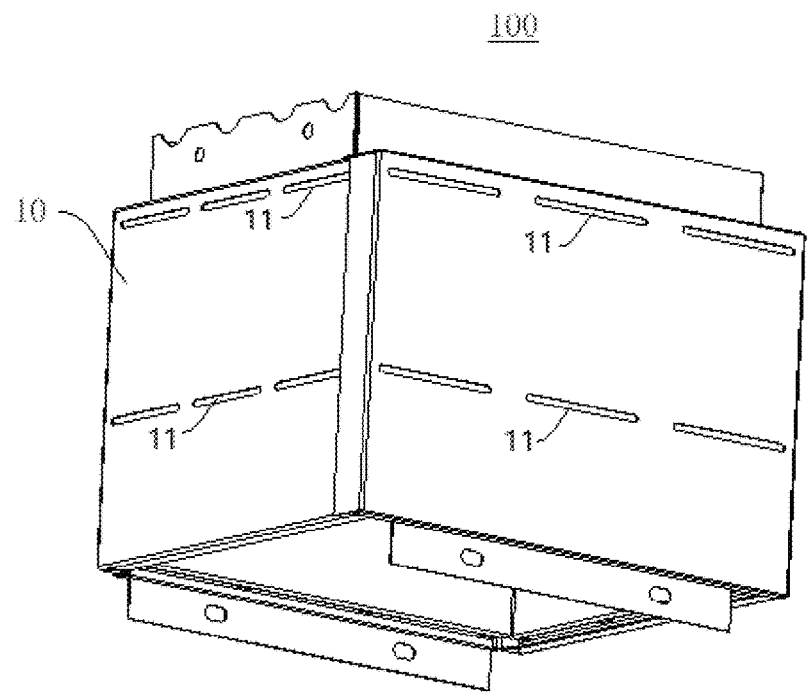
FIG. 10 is a perspective view of a combustion chamber according to other embodiments of the present disclosure.

In one embodiment, as illustrated in FIG. 10 and FIG. 11, the air inlet hole 11 is in an elongated shape. As such, a distribution length of the air inlet holes 11 along the circumferential direction can be extended, thereby further enlarging the air inlet surface of the first surrounding plate 10 along the circumferential direction and ensuring that the first surrounding plate 10 is sufficiently cooled.

In one embodiment, as illustrated in FIG. 8, the air inlet hole is located above the air outlet hole along the height direction to enable the air flow in each air cavity 31 to flow from top to bottom. In this manner, the air flow in the air cavity 31 is delivered to a lower side of the combustion cavity 21, thereby supplying sufficient secondary air to the burner 300 of the gas apparatus 1000, and improving the combustion efficiency.

Figure 14:
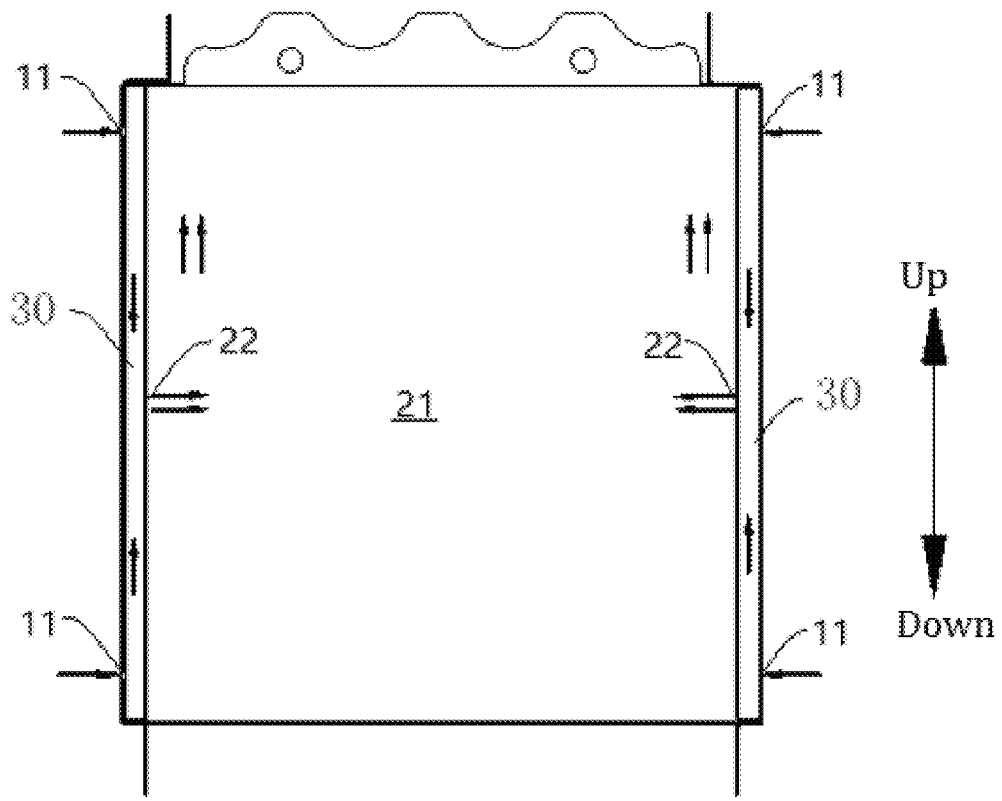
FIG. 14 is a schematic diagram showing a longitudinal structure of a combustion chamber according to yet other embodiments of the present disclosure.

In one embodiment, as illustrated in FIG. 14, each of the air cavities 31 has an air inlet hole 11 provided on each of an upper side and a lower side thereof, and the air outlet hole 22 is located between the air inlet holes 11 on the upper side and the lower side of the air cavity 31. That is, for one air cavity 31, air is supplied into the air cavity 31 from an upper direction and a lower direction at the same time, and is discharged from the air outlet hole 22 in one direction. In this example, cool air may be supplied to the upper side and the lower side of the air cavity 31 simultaneously. Such an arrangement of holes can well solve a problem that when an air flow is inhaled from one side (upper side or lower side) of the air cavity 31 and gets too hot when it flows to another side of the air cavity 31, it is impossible to cool the first surrounding plate 10 on the other side.

Figure 9:
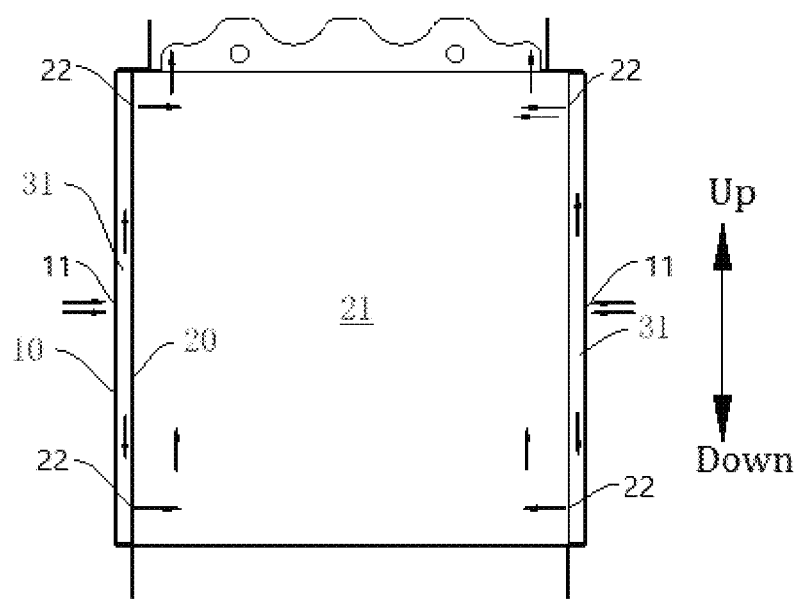
FIG. 9 is a cross-sectional view of a combustion chamber from another angle according to still yet other embodiments of the present disclosure.

In one embodiment, as illustrated in FIG. 9, for each of the air cavities 31, an air flow enters the air cavity 31 from a middle of the air cavity 31 and flows out from an upper side and a lower side of the air cavity 31. In this example, air is inhaled from a horizontal direction, and discharged from two other horizontal directions (one is located on the upper side of the air inlet hole 11, and the other is located on the lower side of the air inlet hole 11), and both the upper side and the lower side of the first surrounding plate 10 can be cooled. Such an arrangement of holes is suitable for a case where a height of the combustion cavity 21 is low.

In one embodiment, as illustrated in FIG. 8, layers of the air duct 30 are defined by the first surrounding plate 10 and the second surrounding plate 20 and distributed along a height direction. That is, air ducts 30 are arranged around the combustion cavity 21 along the height direction. Parts of the first surrounding plate 10 at different heights are cooled through air ducts 30, and air is also delivered to the combustion cavity 21 from different height directions. In this embodiment, different layers of the air duct 30 may have the same structure or different structures, and the combustion cavity 21 can have various structures of the air duct 30 along the circumferential direction, thereby obtaining an optimal cooling and air supply effect.

Further, in one example, each of the layers of the air duct 30 has a same height and a same air flow direction. That is, an air supply manner and an air supply volume of each layer of the air duct 30 are approximately the same, and heat that can be taken away from the first surrounding plate 10 by each layer of the air duct 30 is approximately the same.

The combustion chamber 100 according to yet other embodiments in the first aspect of the present disclosure will be described below with reference to FIG. 12 to FIG. 19 and FIG. 6. As illustrated in FIG. 12, the first surrounding plate 10 and the second surrounding plate 20 are spaced apart from each other to define a single-cavity air duct 30 in communication with the combustion cavity 21 and surrounding the combustion cavity 21 along a circumferential direction of the combustion cavity 21, the single-cavity air duct 30 has an air inlet hole 11 and an air outlet hole 22, and when a negative pressure is formed in the combustion cavity 21, air in the single-cavity air duct 30 is delivered into the combustion cavity 21. Here, the "single-cavity air duct" means that one cavity is formed along a same circumferential direction of the combustion cavity 21. In addition, the air inlet hole 11 and the air outlet hole 22 can be provided on each side of the first surrounding plate 10 to quickly introduce air from various directions into the single-cavity air duct 30.

In other words, a flow path of air in the single-cavity air duct 30 includes the circumferential direction, and a top-bottom/bottom-top direction. In this way, under the suction of the fan 200, a negative pressure is formed in the combustion cavity 21, and the air enters the single-cavity air duct 30 from the air inlet hole 11, and flows out from the air outlet hole 22. During the process, temperatures of the air in the entire single-cavity air duct 30 can be relatively uniform, and thus different directions of the first surrounding plate 10 can be cooled simultaneously. Here, the fan 200 may be a direct current fan or an alternating current fan.

In short, with the combustion chamber 100 according to the embodiments of the present disclosure, by providing the single-cavity air duct 30 along the circumferential direction of the combustion cavity 21, the circumferential direction of the first surrounding plate 10 can be cooled by air at substantially the same temperature, thereby prolonging the service life of the components of the gas apparatus. In addition, air can be delivered to the combustion cavity 21 from the circumferential direction simultaneously, thereby supplying enough secondary air and improving the combustion efficiency.

In some optional embodiments, both the first surrounding plate 10 and the second surrounding plate 20 of the combustion chamber 100 are made of a steel plate. Compared with the use of oxygen-free copper or a heat insulation material, the steel plate has higher plasticity. Hence, a connection process between the first surrounding plate 10 and the second surrounding plate 20 is relatively simple. For example, the first surrounding plate 10 and the second surrounding plate 20 can be connected to each other by welding, and a structure of the single-cavity air duct 30 can be formed by bending the first surrounding plate 10 or the second surrounding plate 20, thereby simplifying structuring and shaping.

In one embodiment, as illustrated in FIG. 12 to FIG. 19 and with reference to FIG. 6, the air inlet hole 11 is formed in the first surrounding plate 10, and the air outlet hole 22 is formed in the second surrounding plate 20. In this manner, the cold air can blow away a hot air flow from the outer side to the inner side and block the hot air flow from diffusing to the outer side, which is more conducive to lowering the temperature of the first surrounding plate 10.

In one embodiment, as illustrated in FIG. 12 to FIG. 19 and with reference to FIG. 6, the air inlet hole 11 and the air outlet hole 22 are staggered along the height direction. For example, air enters the single-cavity air duct 30 from a direction of the first surrounding plate 10 and flows out of the single-cavity air duct 30 from another direction of the second surrounding plate 20. In this manner, the air does not directly pass through the single-cavity air duct 30 from a same height direction, but can flow along the height direction to realize cooling of regions of the first surrounding plate 10 at different heights. The single-cavity air duct 30 may have one or more air inlet holes 11. In one embodiment, the air inlet holes 11 are horizontally distributed across the circumference of the first surrounding plate 10 as much as possible, and an air inlet surface of the first surrounding plate 10 along the circumferential direction can be enlarged to ensure the first surrounding plate 10 to be sufficiently cooled.

Figure 19:
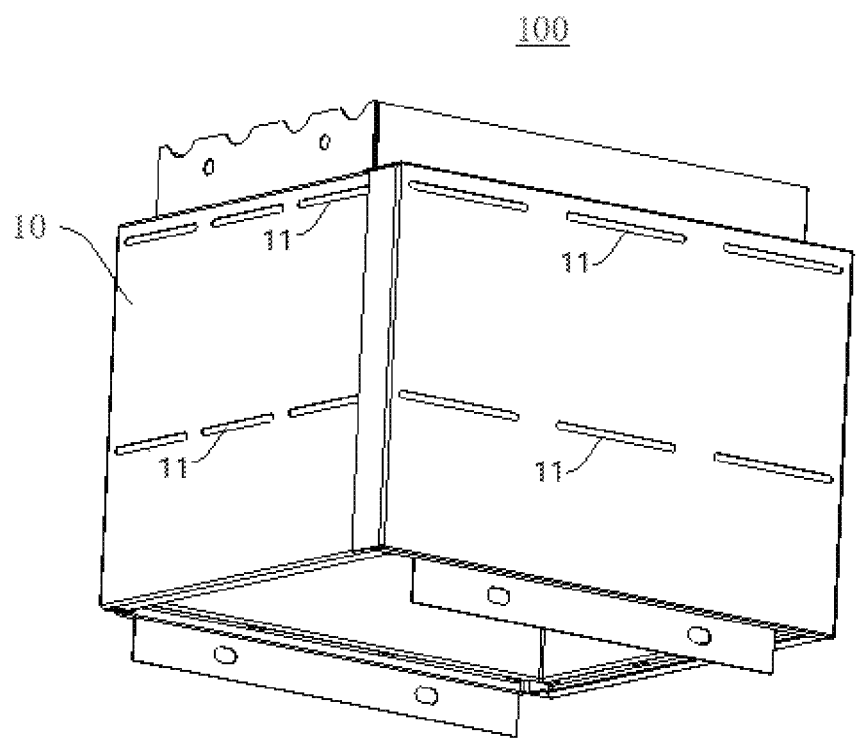
FIG. 19 is a perspective view of a combustion chamber according to yet other embodiments of the present disclosure.

In one embodiment, as illustrated in FIG. 19 and FIG. 6, the air inlet hole 11 is in an elongated shape. As such, a distribution length of the air inlet holes 11 can be extended as long as possible, thereby further enlarging the air inlet surface of the first surrounding plate 10 and ensuring that the first surrounding plate 10 is sufficiently cooled.

Figure 13:
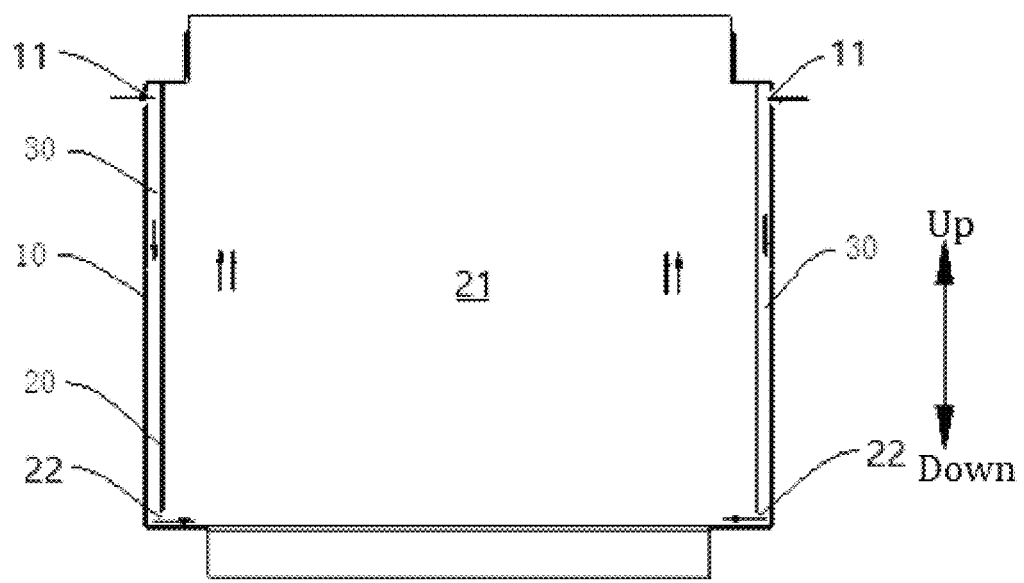
FIG. 13 is a schematic diagram showing a longitudinal structure of a combustion chamber according to yet other embodiments of the present disclosure.

In one embodiment, as illustrated in FIG. 13, the air flow in the single-cavity air duct 30 flows from top to bottom. In this way, the air flow in the single-cavity air duct 30 is delivered to a lower side of the combustion cavity 21, thereby supplying sufficient secondary air to the burner 300 of the gas apparatus, and improving the combustion efficiency.

In one embodiment, as illustrated in FIG. 14, the single-cavity air duct 30 has an air inlet hole 11 provided on each of an upper side and a lower side thereof, and the air outlet hole 22 is located between the air inlet holes 11 on the upper side and the lower side of the single-cavity air duct 30. That is, air is supplied into the single-cavity air duct 30 from an upper direction and a lower direction at the same time, and is discharged from the air outlet hole 22 in another direction. In this example, cool air may be supplied to the upper side and the lower side of the single-cavity air duct 30 simultaneously. Such an arrangement of holes can well solve a problem that when an air flow is inhaled from one side (upper side or lower side) of the single-cavity air duct 30 and gets too hot when it flows to another side of the air cavity 31, it is impossible to cool the first surrounding plate 10 on the other side.

Figure 15:
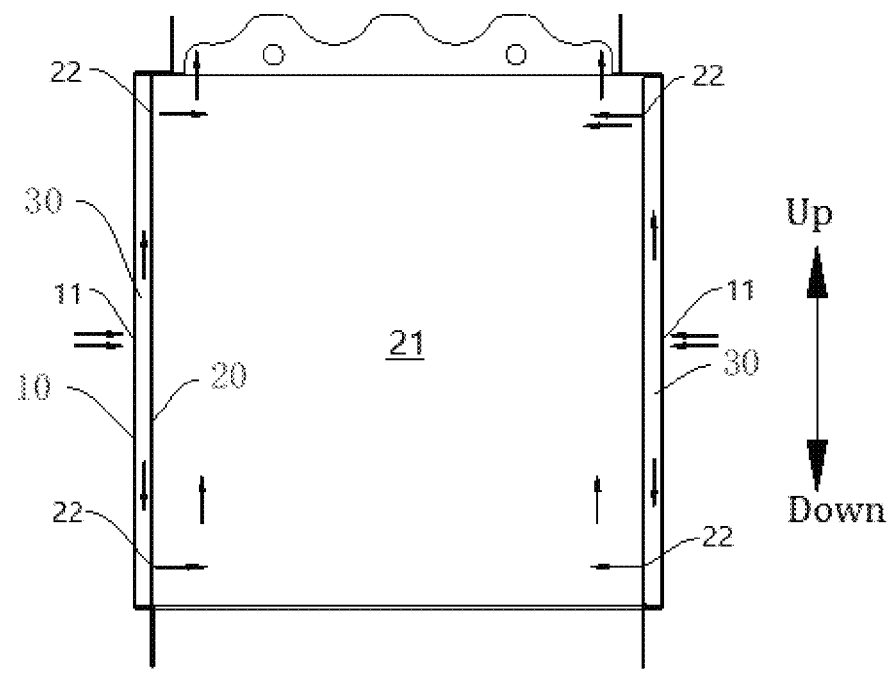
FIG. 15 is a schematic diagram showing a longitudinal structure of a combustion chamber according to yet other embodiments of the present disclosure.

In one embodiment, as illustrated in FIG. 15, an air flow enters the single-cavity air duct 30 from a middle of the single-cavity air duct 30 and flows out from an upper side and a lower side of the single-cavity air duct 30. Such an arrangement of holes is suitable for a case where a height of the combustion cavity 22 is low. By introducing air into the single-cavity air duct 30 from one direction and supplying cool air to two sides of the single-cavity air duct 30, it is possible to cool the upper side and the lower side of the first surrounding plate 10.

Figure 16:
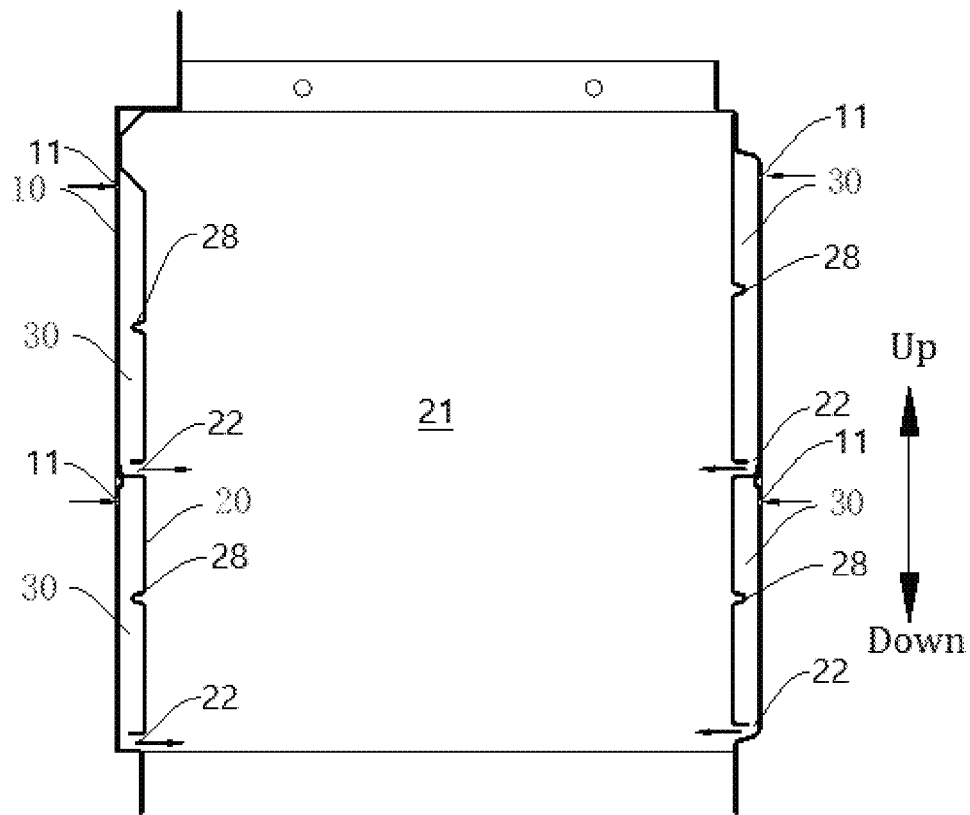
FIG. 16 is a schematic diagram showing a longitudinal structure of a combustion chamber according to yet other embodiments of the present disclosure.

In one embodiment, as illustrated in FIG. 16, layers of the single-cavity air duct 30 are defined by the first surrounding plate 10 and the second surrounding plate 20 and distributed along the height direction. That is, single-cavity air ducts 30 are arranged around the combustion cavity 21 along the height direction. Parts of the first surrounding plate 10 at different heights are cooled through single-cavity air ducts 30, and air is also delivered to the combustion cavity 21 from different height directions. In this embodiment, different layers of the single-cavity air ducts 30 may have the same structure or different structures, and the combustion cavity 21 can have various structures of the single-cavity air duct 30 along the circumferential direction, thereby obtaining an optimal cooling and air supply effect.

In one example, each of the layers of the single-cavity air duct 30 has a same height and a same air flow direction. That is, an air supply manner and an air supply volume of each layer of the single-cavity air duct 30 are approximately the same, and heat that can be taken away from the first surrounding plate 10 by each layer of the single-cavity air duct 30 is approximately the same.

Figure 17:
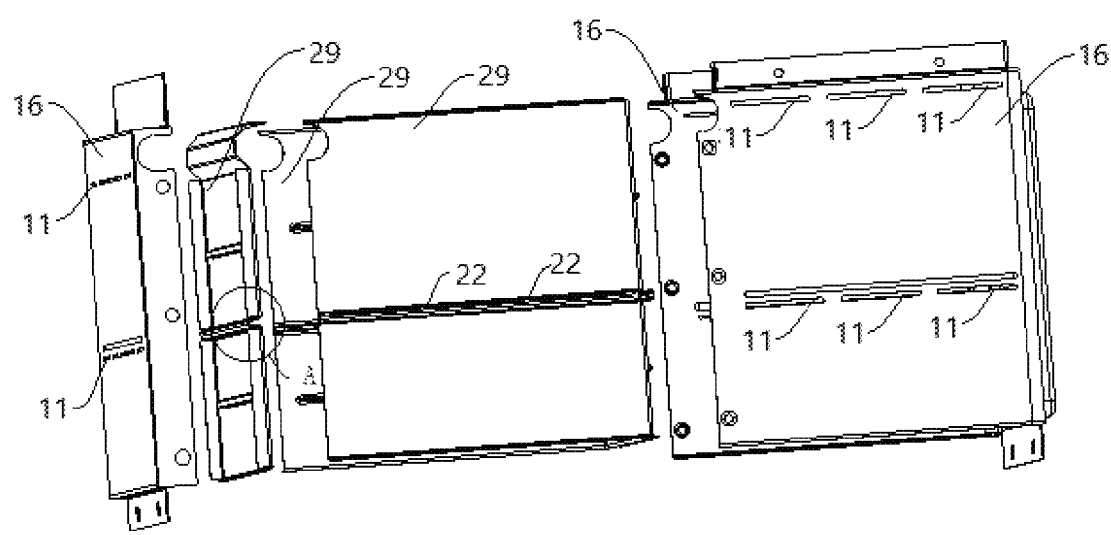
FIG. 17 an exploded view of a combustion chamber according to yet other embodiments of the present disclosure.

In some optional embodiments of the present disclosure, as illustrated in FIG. 19 and with reference to FIG. 17, the first surrounding plate 10 is formed by enclosure of first plates 16, and the second surrounding plate 20 is formed by enclosure of second plates 29. That is, each of the first surrounding plate 10 and the second surrounding plate 20 is formed by an interconnection among plates, and plates on the inner side and the outer side are spaced apart from each other to define a single-cavity air duct 30.

Figure 18:
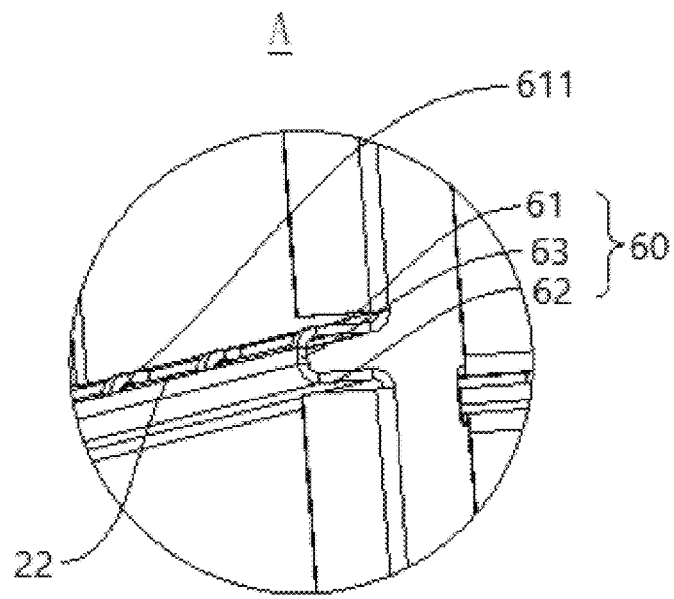
FIG. 18 is a perspective view of a combustion chamber according to yet other embodiments of the present disclosure.

Here, as illustrated in FIG. 17 and with reference to FIG. 18, each of the second plates 29 includes sealing portions 60 recessed from the inner side to the outer side, each of the sealing portions 60 includes an upper wing plate 61, a lower wing plate 62, and a hook portion 63 connecting the upper wing plate 61 with the lower wing plate 62 and abutting an outer wall of the first surrounding plate 10. That is, the second plate 29 is bent to form sealing portions 60. Through matching between sealing portions 60 at different heights and an inner wall surface of the first surrounding plate 10, layers of the single-cavity air duct 30 are formed.

In one embodiment, as illustrated in FIG. 16 and with reference to FIG. 18, the air outlet hole 22 is defined by the upper wing plate 61, and the lower wing plate 62 is attached to an inner wall surface of the first surrounding plate 10.

In one embodiment, as illustrated in FIG. 16, the upper wing plate 61 is further provided with an air shielding plate 611 having one end connected to a hole wall of the air outlet hole 22 and another end extending towards the first surrounding plate 10. The air shielding plate 611 can guide the air flow towards the inner wall of the first surrounding plate 10 as much as possible, and the air flow can flow closely along the inner wall of the first surrounding plate 10. Therefore, the air can fully absorb heat of the first surrounding plate 10.

In one example, reinforcing ribs 28 recessed from the inner side to the outer side are formed on the second surrounding plate 20. Structural strength of the second surrounding plate 20 is improved by reinforcing ribs 28 to prevent the second surrounding plate 20 from being deformed.

The gas apparatus 1000 according to the embodiments of the present disclosure includes the combustion chamber 100 according to any of the above embodiments. Since the combustion chamber 100 according to the embodiments of the present disclosure can effectively prevent heat from being transferred to the outside, prolongs the service life of the components, and improves the combustion efficiency, the gas apparatus 1000 according to the embodiments of the present disclosure therefore has a long service life and high heat efficiency.

In the description of the present disclosure, it should be understood that the orientation or position relationship indicated by the terms "top", "bottom", "inside/inner", "outside/outer", etc., is based on the orientation or position relationship shown in the drawings, and is only for the convenience of describing the present disclosure and simplifying the description, rather than indicating or implying that the apparatus or element in question must have a specific orientation, or be constructed and operated in a specific orientation, and therefore cannot be understood as a limitation of the present disclosure. In addition, the terms "first" and "second" are only used for descriptive purposes, and cannot be understood as indicating or implying relative importance or implicitly indicating the number of related embodiments. Therefore, the features defined with "first" and "second" may explicitly or implicitly include at least one of the features. In the description of the present disclosure, "plurality" means at least two, unless otherwise specifically defined.

In the present disclosure, unless otherwise clearly specified and limited, terms such as "install", "connect", "connect to", "fixed to" and the like should be understood in a broad sense. For example, it may be a fixed connection or a detachable connection or connection as one piece; direct connection or indirect connection through an intermediate element; or internal communication of two components or the interaction relationship between two components, unless otherwise clearly limited. In one embodiment, the specific meaning of the above-mentioned terms in the present disclosure can be understood according to specific circumstances. In the present disclosure, unless stipulated and defined otherwise, a first feature "on" or "under" a second feature may include that the first feature is in direct contact with the second feature, or in indirect contact through an intermediate feature.

In the description of this specification, descriptions with reference to the terms "an embodiment", "some embodiments", "an example", "a specific example", "some examples", etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

What is claimed is:

1. A combustion chamber, comprising:
a first surrounding plate located on an outer side and a second surrounding plate located on an inner side, wherein a combustion cavity is defined by the second surrounding plate, the first surrounding plate and the second surrounding plate are spaced apart from each other to define an air duct in communication with the combustion cavity, and air duct has an air inlet hole formed in the first surrounding plate, and an air outlet hole formed in the second surrounding plate;
wherein when a negative pressure is formed in the combustion cavity, air in the air duct is delivered into the combustion cavity;
wherein the second surrounding plate comprises a second rear plate, a second left plate connected to a left edge of the second rear plate, a second right plate connected to a right edge of the second rear plate, and a second front plate connected to a front edge of the second left plate and a front edge of the second right plate, and the second rear plate, the second left plate, and the second right plate are integrally formed;
wherein an upper end of the second front plate is formed as a bent plate, and the bent plate is at least partially attached to an inner side wall of the first front plate to close an upper side of the air duct, wherein a heat-insulating air chamber is defined by an upper side of the bent plate and the first front plate and is in no communication with the combustion cavity, and wherein a part of the air inlet hole is adjacent to the bent plate.

2. The combustion chamber according to claim 1, wherein a bottom end and a top end of the air duct is closed, and wherein the air inlet hole and the air outlet hole are staggered along a height direction.

3. The combustion chamber according to claim 1, wherein the air inlet hole is located above the air outlet hole along a height direction.

4. The combustion chamber according to claim 1, wherein the first surrounding plate comprises a first rear plate, a first left plate connected to a left edge of the first rear plate, a first right plate connected to a right edge of the first rear plate, and a first front plate connected to a front edge of the first left plate and a front edge of the first right plate, and the first rear plate, the first left plate, and the first right plate are integrally formed.

5. The combustion chamber according to claim 1, wherein the air inlet hole is in an elongated shape, and wherein at least one of the first surrounding plate and the second surrounding plate is a steel plate.

6. The combustion chamber according to claim 1, wherein a hole wall of the air outlet hole of the second surrounding plate forms an air shielding plate extending towards an inner wall of the first surrounding plate.

7. The combustion chamber according to claim 1, wherein the first surrounding plate and the second surrounding plate are spaced apart from each other to define at least a first-layer air duct and a second-layer air duct that are in communication with the combustion cavity, each of the first-layer air duct and the second-layer air duct has an air inlet hole formed in the first surrounding plate, and an air outlet hole formed in the second surrounding plate, the air inlet hole of the first-layer air duct is located above the air outlet hole of the first-layer air duct along a height direction, and the air inlet hole of the second-layer air duct is located below the air outlet hole of the second-layer air duct along the height direction.

8. The combustion chamber according to claim 1, wherein a plurality of air ducts are defined by the first surrounding plate and the second surrounding plate and distributed along a height direction.

9. The combustion chamber according to claim 8, wherein each of the plurality of air ducts has a same height and a same air flow direction.

10. A combustion apparatus, comprising the combustion chamber according to claim 1.

11. The combustion chamber according to claim 1, the first surrounding plate and the second surrounding plate together define a pipe groove extending along a left-right direction, a part of a water pipe of a heat exchanger passable through the pipe groove.

* * * * *